(12) United States Patent
Casteel

(10) Patent No.: US 9,481,130 B2
(45) Date of Patent: Nov. 1, 2016

(54) METHOD OF PERMANENTLY JOINING PLASTIC COMPONENTS AND A PLASTIC COMPONENT JOINING ASSEMBLY

(71) Applicant: INTEVA PRODUCTS, LLC, Troy, MI (US)

(72) Inventor: Donald Eugene Casteel, Rainbow City, AL (US)

(73) Assignee: INTEVA PRODUCTS, LLC, TROY, MI (US)

( * ) Notice: Subject to any disclaimer, the term of this patent is extended or adjusted under 35 U.S.C. 154(b) by 704 days.

(21) Appl. No.: 13/828,424

(22) Filed: Mar. 14, 2013

(65) Prior Publication Data

US 2013/0240138 A1     Sep. 19, 2013

Related U.S. Application Data

(60) Provisional application No. 61/610,719, filed on Mar. 14, 2012.

(51) Int. Cl.
*B29C 65/14* (2006.01)
*B29C 65/00* (2006.01)
*B29C 65/16* (2006.01)

(52) U.S. Cl.
CPC ........ *B29C 65/1403* (2013.01); *B29C 65/1632* (2013.01); *B29C 65/1667* (2013.01); *B29C 65/1687* (2013.01); *B29C 66/1142* (2013.01); *B29C 66/54* (2013.01); *B29C 66/543* (2013.01); *B29C 66/8322* (2013.01); *B29C 65/1612* (2013.01); *B29C 65/1635* (2013.01); *B29C 66/73921* (2013.01); *B29C 66/91216* (2013.01); *B29C 66/91221* (2013.01)

(58) Field of Classification Search
CPC .......... B29C 65/1612; B29C 65/1632; B29C 65/1635; B29C 65/1667; B29C 65/1687; B29C 66/1142; B29C 66/73921; B29C 66/543; B29C 66/91216; B29C 66/91221; B29C 65/1403; B29C 66/8322; B29C 66/54
See application file for complete search history.

(56) References Cited

U.S. PATENT DOCUMENTS

| | | | | |
|---|---|---|---|---|
| 5,817,206 A | * | 10/1998 | McAlea | B29C 67/0077 156/272.8 |
| 2002/0008089 A1 | * | 1/2002 | Grewell | B23K 26/073 219/121.63 |
| 2003/0141009 A1 | * | 7/2003 | Landherr | B23K 26/067 156/158 |

FOREIGN PATENT DOCUMENTS

| | | |
|---|---|---|
| RU | 2234057 C1 | 8/2004 |
| SU | 1599239 A1 | 10/1990 |

OTHER PUBLICATIONS

International Search Report dated Jul. 4, 2013 for International Application No. PCT/US2013/031534.
Written Opinion dated Jul. 4, 2013 for International Application No. PCT/US2013/031534.

* cited by examiner

*Primary Examiner* — Jacob T Minskey
*Assistant Examiner* — Vishal I Patel
(74) *Attorney, Agent, or Firm* — Cantor Colburn LLP

(57) ABSTRACT

A method of permanently joining plastic components is provided. The method includes orienting a first plastic component having at least one first rib in close proximity to a second plastic component having at least one second rib. Also included is positioning a plurality of fiber-optic cables in a location between the first plastic component and the second plastic component, wherein each of the plurality of fiber-optic cables include a first end and a second end. Further included is generating a laser beam that is directed into the first end of the plurality of fiber-optic cables and terminating proximate the second end of the plurality of fiber-optic cables.

5 Claims, 8 Drawing Sheets

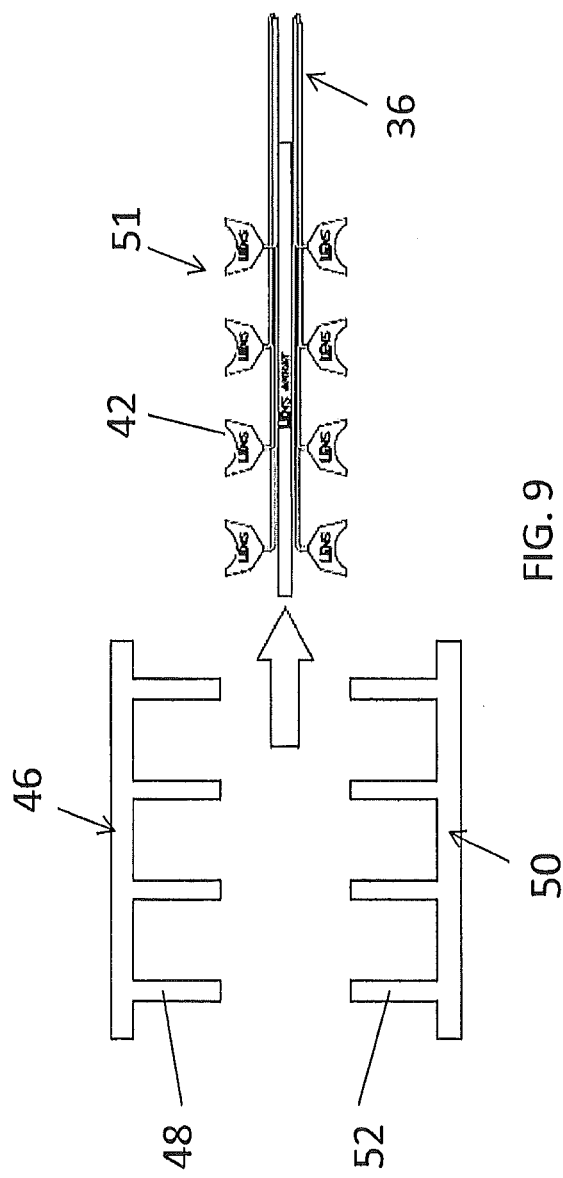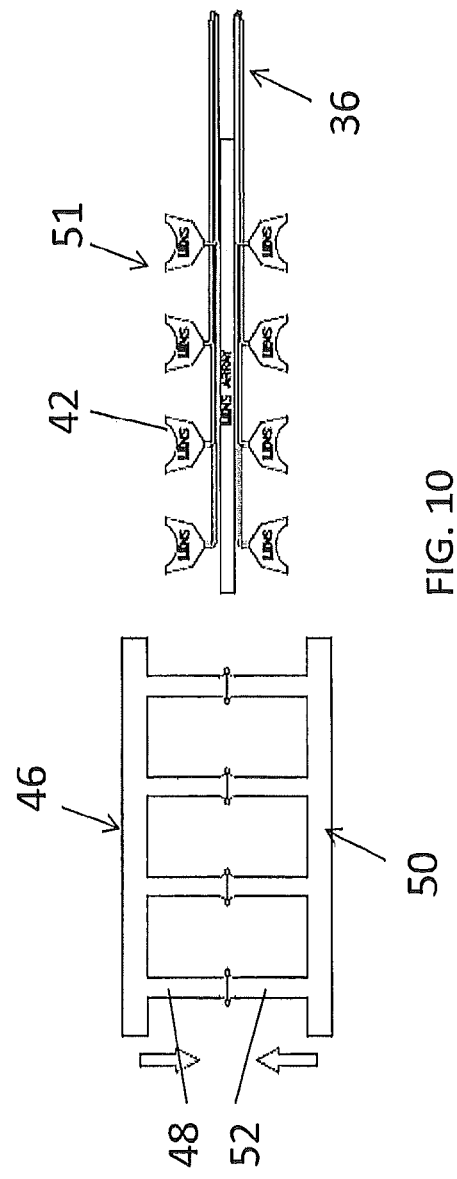

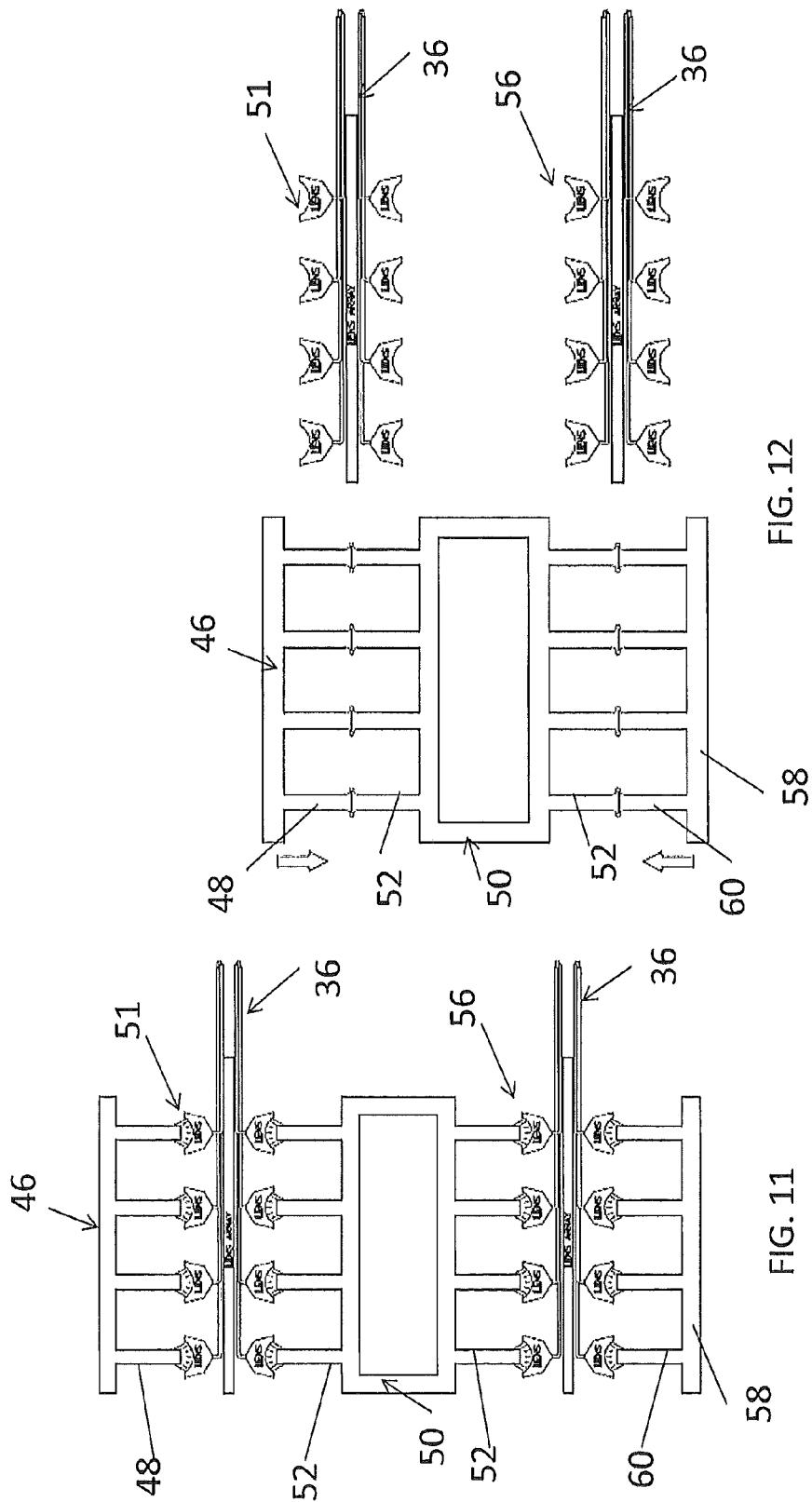

METHOD OF PERMANENTLY JOINING PLASTIC COMPONENTS AND A PLASTIC COMPONENT JOINING ASSEMBLY

BACKGROUND

The subject matter disclosed herein relates to joined components, and more particularly to an assembly for joining plastic components, as well as a method of joining such plastic components.

Various methods and assemblies for permanently joining plastic components are currently employed. "Hot-plate" welding requires a lengthy process based, in part, on getting the system up to operating temperature. Welding produces plastic strings or hair due to direct contact with molten plastic. Additionally, generation of fumes and smoke must be exhausted from the working environment. A large percentage of the energy required escapes the system as waste heat that often undesirably affects areas other than the welding area of the plastic components. Residue build up on the heating surface requires frequent cleaning and overall process control is often heavily limited.

Infrared welding often requires shielding to protect the plastic components from heat, however, this is problematic based on thermal expansion that causes the shield to warp and distort. As is the case with "hot-plate" welding, a large percentage of the energy required escapes the system as waste heat. Additionally, complex electric wiring is required when using multiple infrared bulbs and infrared emitters are difficult to arrange in a pattern that supports the product configuration.

Infrared laser welding typically requires an opaque component and a transparent component, clamped together in a desired configuration. Laser energy, guided robotically, passes through the transparent component at the weld location to heat the opaque material to a melt temperature, with the heat then being conducted to the transparent material to achieve melt temperature, thereby welding the plastic components together at the corresponding melting locations. Undesirably, laser power in such a process often overheats the plastic before heat is conducted throughout the material. Additionally, attempts to use this method where both components are opaque require the components to be separated during the laser exposure to allow access to the ribs. This results in the need to traverse the pattern in its entirety before joining the components together. The plastic at the beginning of the pattern will have a different heat profile than the plastic at the end of the pattern resulting from cooling at the beginning of the pattern as the pattern is being traversed.

SUMMARY

According to one embodiment, a method of permanently joining plastic components is provided. The method includes orienting a first plastic component having at least one first rib in close proximity to a second plastic component having at least one second rib. Also included is positioning a plurality of fiber-optic cables in a location between the first plastic component and the second plastic component, wherein each of the plurality of fiber-optic cables include a first end and a second end. Further included is generating a laser beam that is directed into the first end of the plurality of fiber-optic cables and terminating proximate the second end of the plurality of fiber-optic cables. Yet further included is arranging a first laser array comprising the second end of the plurality of fiber-optic cables proximate the at least one first rib and the at least one second rib, wherein the second end of each of the plurality of fiber-optic cables includes an optical lens for directing a heating energy produced by the first laser array onto the at least one first rib and the at least one second rib. Also included is removing the plurality of fiber-optic cables from the location between the first plastic component and the second plastic component. Further included is contacting the at least one first rib and the at least one second rib to form a welded joint assembly.

According to another embodiment, a plastic component joining assembly includes a first plastic component having at least one first rib. Also included is a second plastic component having at least one second rib. Further included is a plurality of fiber-optic cables, each having a first end and a second end, wherein the first end is positioned within a housing having a plurality of apertures for receiving the first end of the plurality of fiber-optic cables. Yet further included is a laser generator positioned to direct a laser beam into a moveable reflective component configured to direct the laser beam through the plurality of fiber-optic cables from the first end to the second end having an optical lens, wherein the second end of the plurality of fiber-optic cables are arranged in a first laser array proximate the at least one first rib and the at least one second rib for directing a heating energy produced by the first laser array onto the at least one first rib and the at least one second rib.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Referring now to the figures, which are exemplary embodiments, and wherein like elements are numbered alike:

FIG. 9 is a schematic view of the first laser array being removed from proximate the first plastic component and the second plastic component;

FIG. 10 is a schematic view of the first plastic component and the second plastic component being contacted to form a permanent joining;

FIG. 11 is a schematic view of the second plastic component and a third plastic component being heated by a second laser array; and FIG. 12 is a schematic view of the first plastic component being contacted with the second plastic component and the second plastic component being contacted with the third plastic component.

The detailed description explains embodiments of the invention, together with advantages and features, by way of example with reference to the drawings.

DETAILED DESCRIPTION OF THE INVENTION

Figure 1:
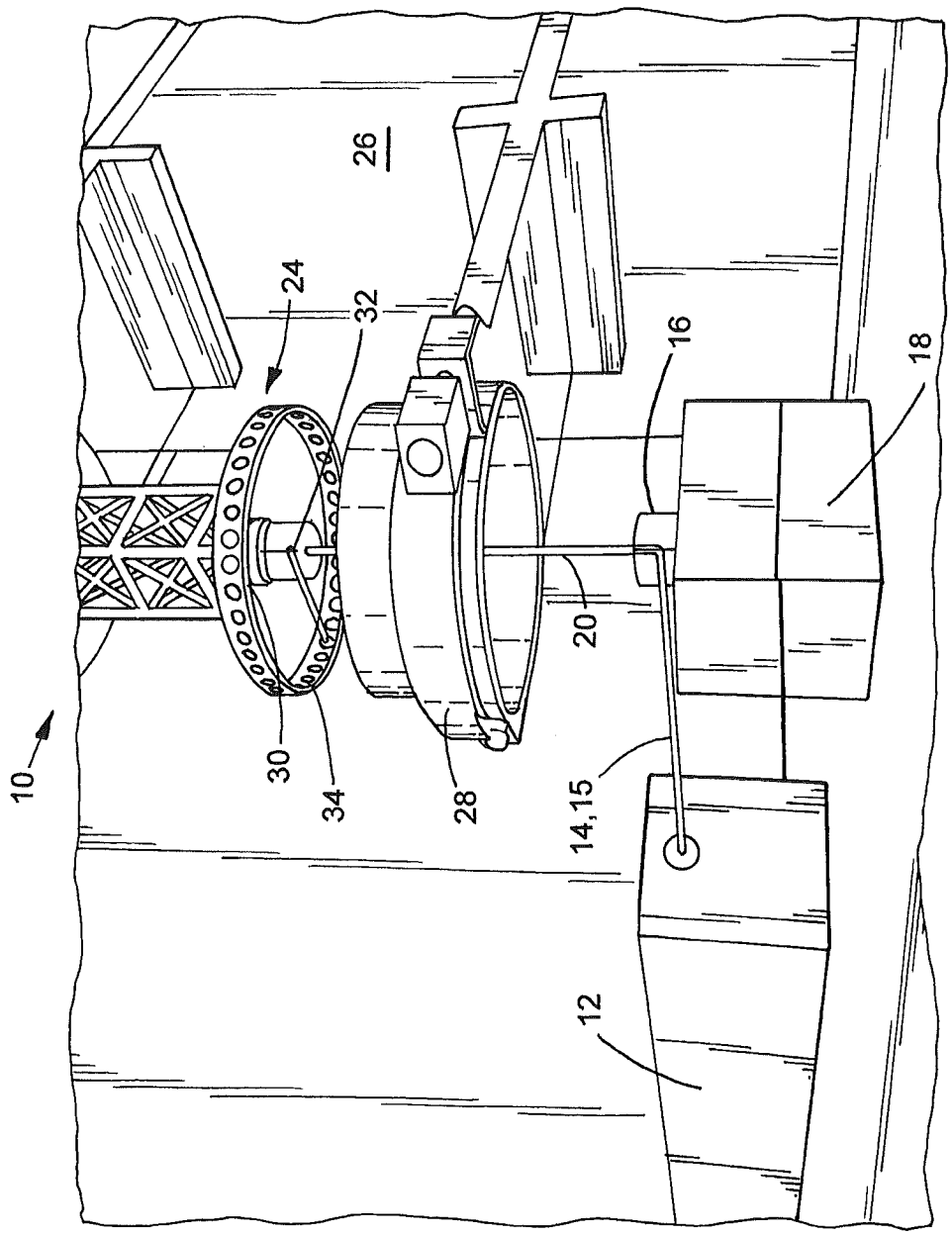
FIG. 1 is a perspective view of a plastic joining component assembly.

Referring now to FIG. 1, a plastic component joining assembly is illustrated and is generally referred to with numeral 10. The plastic component joining assembly 10 includes a laser generator 12 that is configured to produce a laser beam 14 in a first direction 15 toward a stationary reflective component 16, such as a mirror. The stationary reflective component 16 may be disposed on a first fixture 18 to align with the laser beam 14 and positioned to controllably redirect the laser beam 14 toward a desired component along a second direction 20 that may be relatively perpendicular to the first direction 15, however, redirection of the laser beam 14 in various angular directions is contemplated, based on the overall configuration of the plastic component joining assembly 10.

The plastic component joining assembly 10 also includes a housing 24 that may be a stand-alone unit or operably mounted to a second fixture 26. In the illustrated embodiment, the housing 24 is operably mounted to the second fixture 26, where the second fixture 26 includes at least one, but possibly a plurality of, guiding member 28. The housing 24 is shown as having a relatively circular geometry, however, it is to be appreciated that various other geometries may be suitable. Irrespective of the geometric configuration of the housing 24, the guiding members 28 are in operable engagement with the housing 24, typically proximate a perimeter of the housing 24 to fixedly hold the housing 24 in place. Extending axially through the housing 24 is a member 30 that is rotatable and linearly displaceable. The member 30 supports a moveable reflective component 32, such as a mirror. The moveable reflective component 32 may be of a similar material and construction as that of the stationary reflective component 16, but the moveable reflective component 32 is positioned to receive the laser beam 14 and redirect the laser beam 14 once again. It is contemplated that omission of the stationary reflective component 16 is possible, with the laser beam 14 being directly sent to the moveable reflective component 32 from the laser generator 12. The moveable reflective component 32 redirects the laser beam 14 based on alignment thereof, and the redirection is flexible based on the ability of the member 30 to rotate or linearly displace the moveable reflective component 32. The housing 24 includes a plurality of apertures 34 spaced from one another around the perimeter of the housing 24.

Figure 2:
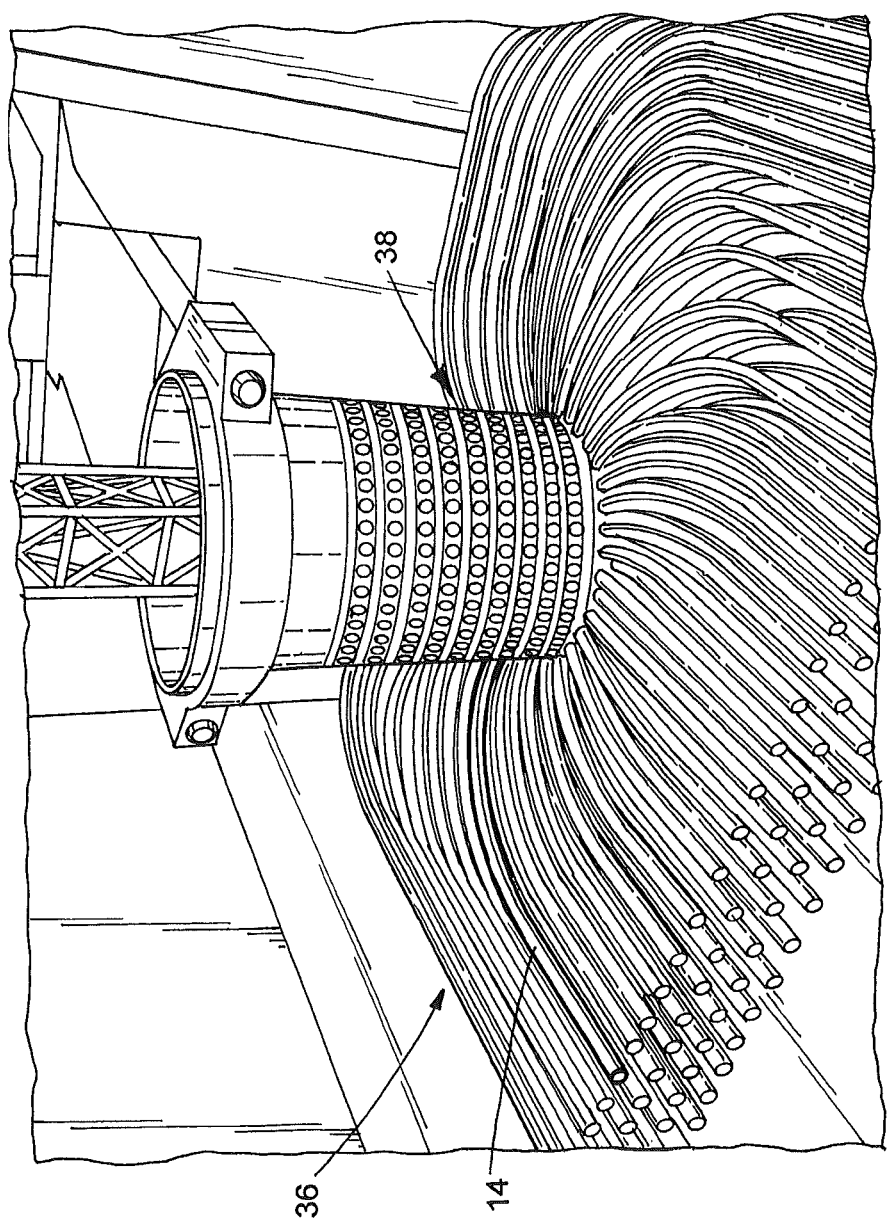
FIG. 2 is a perspective view of a plurality of fiber-optic cables having a laser beam directed therethrough and having a first end operably connected to a housing.
Figure 3:
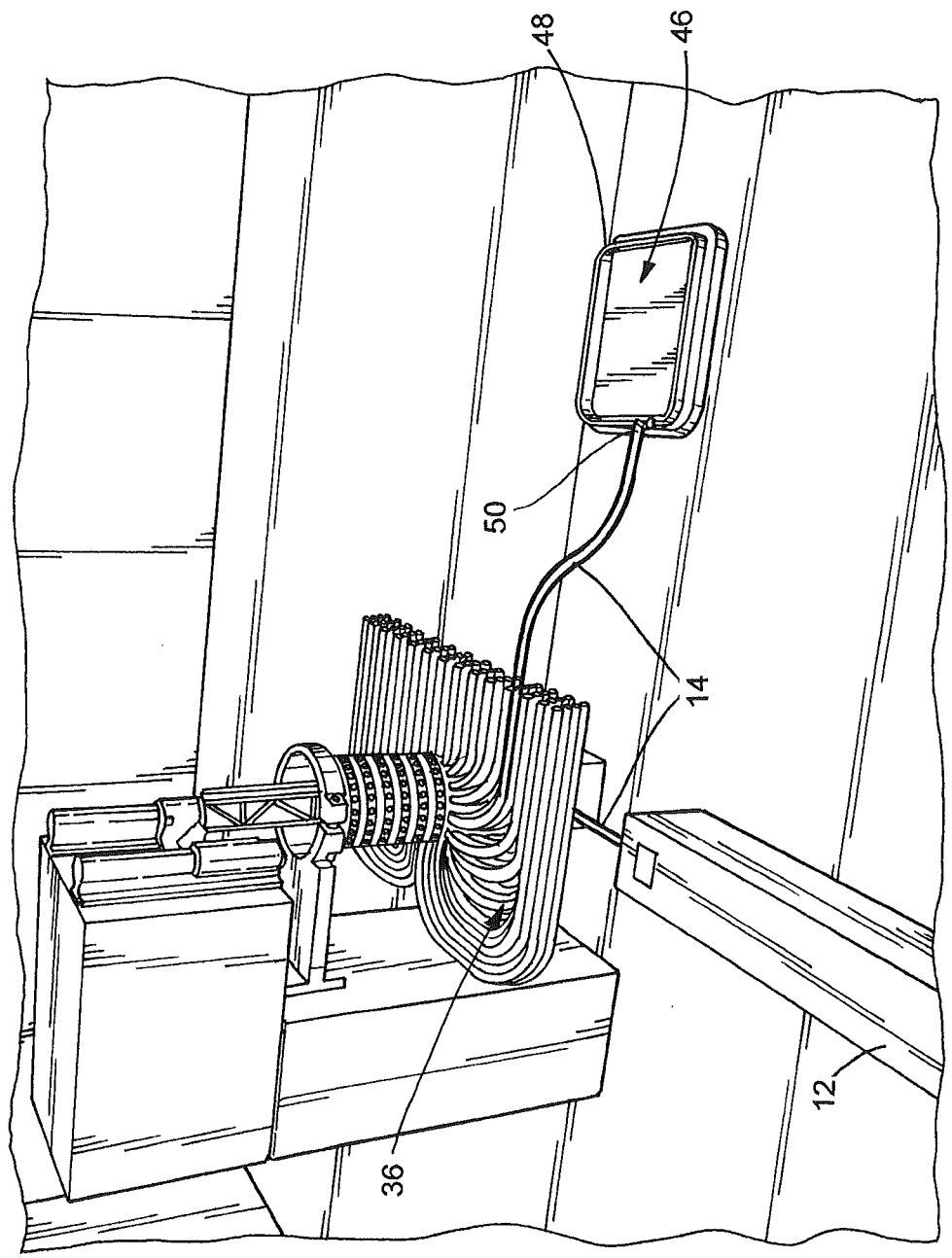
FIG. 3 is a perspective view of the laser beam being directed onto a rib of a plastic component, where a portion of the plurality of fiber-optic cables are not shown.

Referring now to FIGS. 2 and 3, each of a plurality of cables 36, such as fiber-optic cables, includes a first end 38 that is positioned within one of the plurality of apertures 34 of the housing 24. As shown, the laser beam 14 is redirected by the moveable reflective component 32 radially outward toward the plurality of apertures 34, and therefore the plurality of cables 36. As the moveable reflective component 32 is rotated and/or linearly displaced by the member 30, the laser beam 14 shifts from a specific aperture to another aperture of the plurality of apertures 34, and therefore from a specific cable to another cable of the plurality of cables 36. The laser beam 14 then passes through a cable of the plurality of cables 36 toward a second end 40 of the plurality of cables 36, which is not shown for purposes of illustration of the laser beam 14 path.

Figure 5:
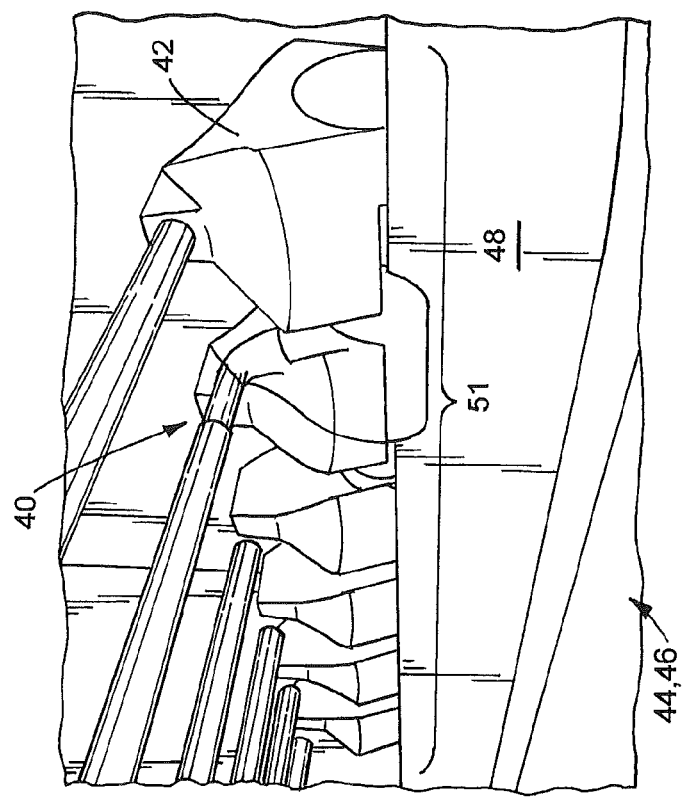
FIG. 5 is a perspective view of a first laser array formed by the second end of the plurality of fiber-optic cables and directed onto the rib of the plastic component.
Figure 4:
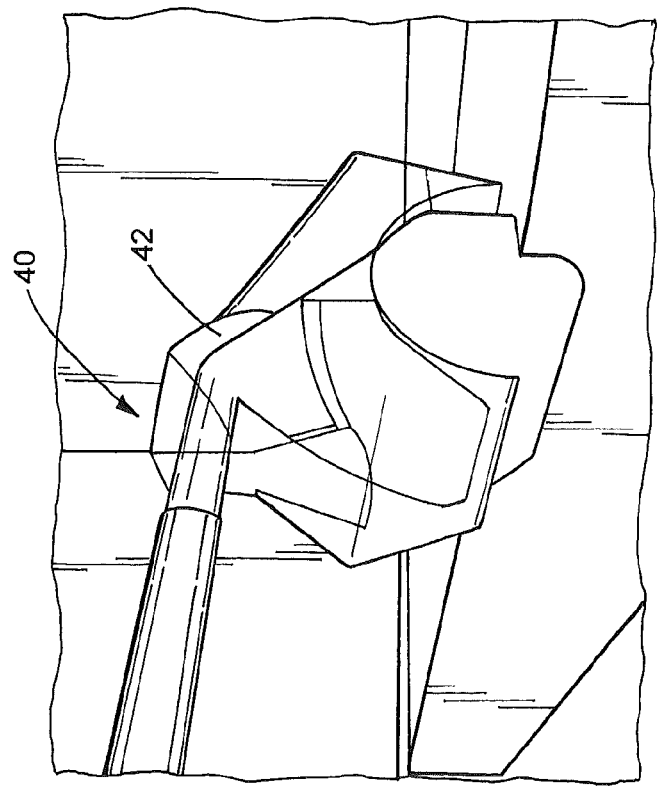
FIG. 4 is a perspective view of a second end of one of the plurality of fiber-optic cables, wherein the second end includes an optical lens for directing a heating energy onto the rib of the plastic component.

Referring to FIGS. 4 and 5, the second end 40 of each of the plurality of cables 36 includes an optical lens 42 configured to focus heating energy over a target location 44. The target location 44 is described herein as a plastic component 46, such as a first plastic component, having at least one first rib 48, but often a plurality of first ribs, that is to be joined to another component, such as a second plastic component 50, which is illustrated in FIGS. 7-12, and will be discussed in detail below. A multitude of the second ends 40 of the plurality of cables 36 may be arranged proximate the first plastic component 46 and the second plastic component 50, such that a laser array 51 is formed. An infrared energy sensor may be included proximate the first end 38 of the plurality of cables 36 to detect a temperature of the target location 44. Temperature detection enhances the process of joining the plastic components 46, 50.

Figure 6:
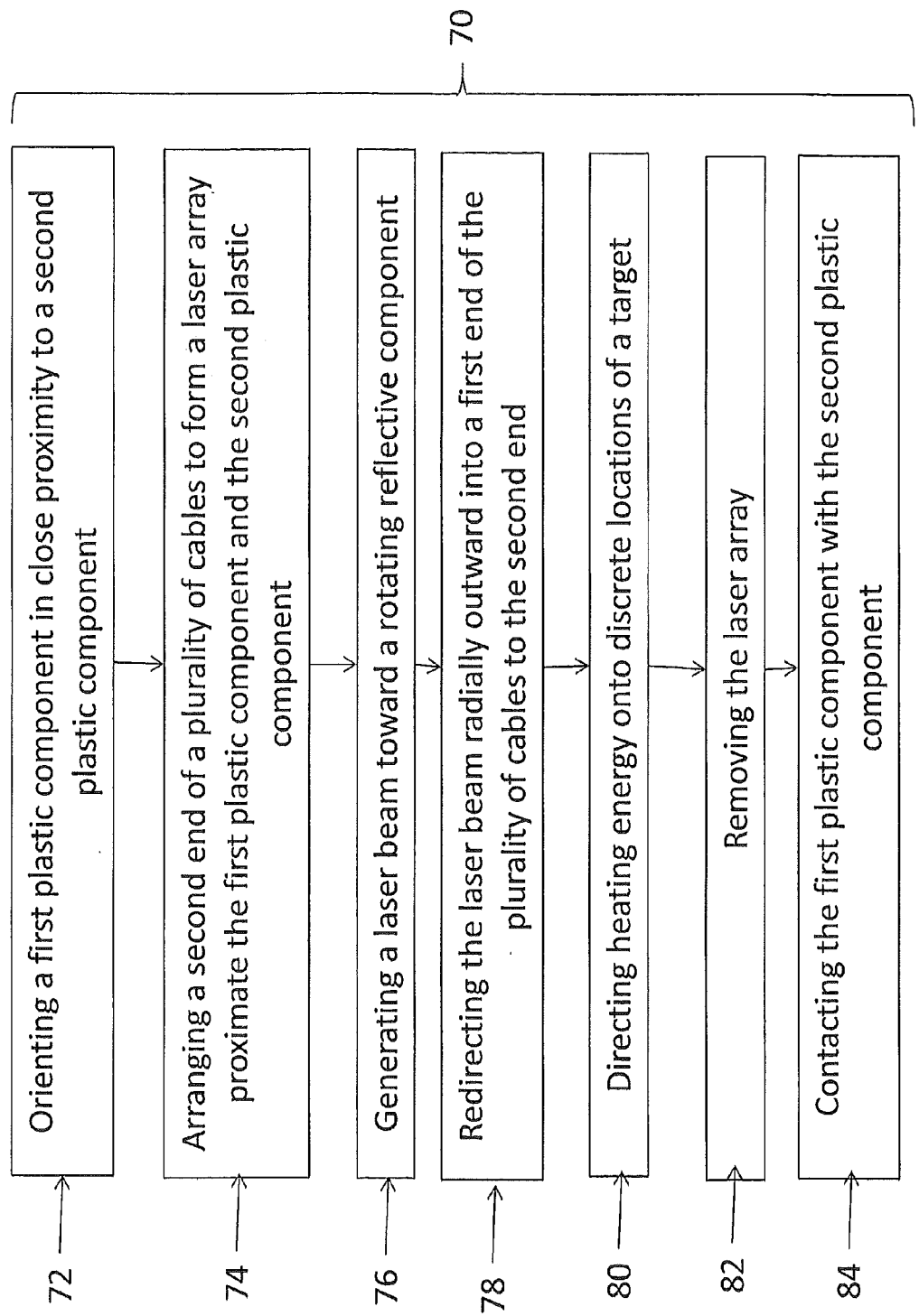
FIG. 6 is a flow diagram illustrating a method of permanently joining plastic components.
Figure 7:
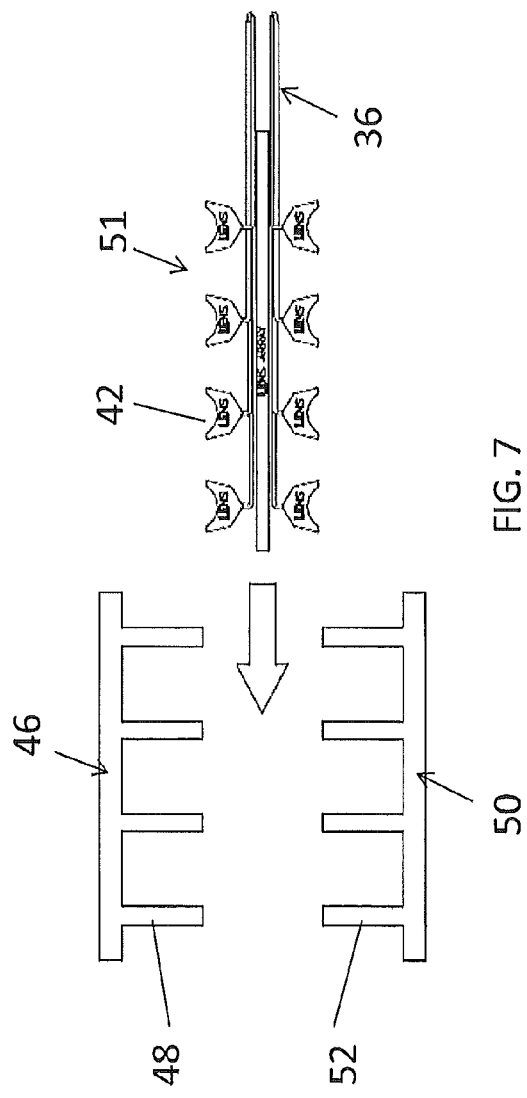
FIG. 7 is a schematic view of the method of permanently joining plastic components, wherein the first laser array is arranged proximate a first plastic component and a second plastic component.
Figure 8:
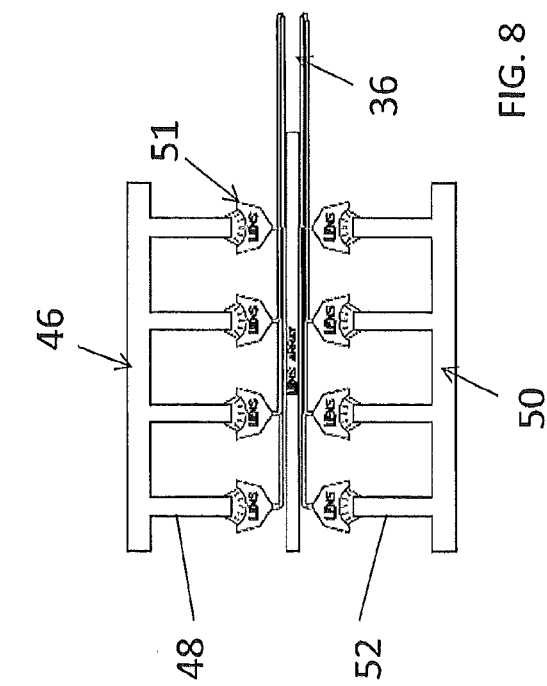
FIG. 8 is a schematic view of the first laser array directing a heating energy onto the first plastic component and the second plastic component.

Referring to FIG. 6, a method 70 of permanently joining plastic components is also provided. The plastic component joining assembly 10 has been previously described and specific components need not be described in further detail. The method 70 includes orienting 72 the first plastic component 46 in close proximity to the second plastic component 50, and more specifically orienting the plurality of first ribs 48 proximate a second plurality of ribs 52 of the second plastic component 50. The laser generator 12 generates the laser beam 14 into the moveable reflective component 32 for redirection into the first end 38 of the plurality of cables 36, with the laser beam 14 being intermediately redirected between the laser generator 12 and the moveable reflective component 32 by the stationary reflective component 16. The first end of the plurality of cables 36 are positioned within the plurality of apertures 34 of the housing 24, such that the laser beam 14 may be directed into the first end 38 of the plurality of cables 36.

Referring to FIGS. 7-10 in addition to the flow diagram of FIG. 6, the method 70 is further illustrated. Specifically, the second end 40 of the plurality of cables 36 are arranged 74 (FIG. 7) proximate the first plurality of ribs 48 and the second plurality of ribs 52, thereby forming the laser array 51 with the optical lens 42 disposed on the second end 40 of each of the plurality of cables 36. Although described previously, it is to be understood that the laser beam 14 from the laser generator 12 through the plastic component joining assembly 10 to the second end 40 of each of the plurality of cables 36 (i.e., laser array 51) is generated 76 (FIG. 8) subsequent to arranging 74 of the laser array 51 in a target location where a heating energy is to be produced. Typically, this will be proximate the at least one first rib 48 and the at least one second rib 52, however, it is contemplated that various other targets may benefit from the heating energy produced by the plastic component joining assembly 10.

In operation, as the laser beam 14 is generated 76 into the moveable reflective component 32 and redirected 78 radially outward toward the plurality of apertures 34 into the plurality of cables 36, the moveable reflective component 32 is manipulated by the member 30 to alter the redirection of the laser beam 14, thereby sending the laser beam 14 through distinct apertures and therefore distinct cables. The redirection into distinct cables is achieved by rotational and/or linear displacement of the moveable reflective component 32. The laser array 51 is controllably situated to have the laser beam 14 enter the first end 38 through the plurality of apertures 34 and produce heating energy on desired locations. By directing heating energy onto discrete locations of a target 80, excessive and unnecessary heat buildup throughout the process is avoided.

Subsequent to appropriate heating of the at least one first rib 48 and the at least one second rib 52, the laser array 51 is removed 82 (FIG. 9) from an area proximate the first plastic component 46 and the second plastic component 50. With sufficient heat having been applied, the at least one first rib 48 and the at least one second rib 52 are contacted 84 (FIG. 10) to form a weld, thereby permanently joining the first plastic component 46 and the second plastic component 50.

Referring to FIGS. 11 and 12, the method described above is illustrated in an embodiment having more than two plastic components that are to be joined during operation of the plastic component joining assembly 10. Advantageously, a second laser array 56 is arranged in close proximity to the second plastic component 50 and a third plastic component 58 that includes at least one third rib 60, but typically a third plurality of ribs. Similar to the previously described method of joining the first plastic component 46 and the second plastic component 50, the second plastic component 46 and the third plastic component 58 are sufficiently heated, with the first laser array 51 and the second laser array 56 being subsequently removed. In addition to the first plastic component 46 and the second plastic component 50 being contacted, the second plastic component 50 and the third plastic component 58 are also contacted to form a single, permanently joined assembly comprising the first plastic component 46, the second plastic component 50 and the third plastic component 58.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of permanently joining plastic components comprising:
    orienting a first plastic component having at least one first rib in close proximity to a second plastic component having at least one second rib;
    positioning a plurality of fiber-optic cables in a location between the first plastic component and the second plastic component, wherein each of the plurality of fiber-optic cables include a first end and a second end;
    generating a laser beam that is directed into the first end of the plurality of fiber-optic cables and terminating proximate the second end of the plurality of fiber-optic cables, wherein generating a laser beam that is directed into the first end of the plurality of fiber-optic cables comprises positioning a laser generator to direct the laser beam at a moveable reflective component and reflecting the laser beam into the first end of the plurality of fiber-optic cables;
    arranging a first laser array comprising the second end of the plurality of fiber-optic cables proximate the at least one first rib and the at least one second rib, wherein the second end of each of the plurality of fiber-optic cables includes an optical lens for directing a heating energy produced by the first laser array onto the at least one first rib and the at least one second rib;
    removing the plurality of fiber-optic cables from the location between the first plastic component and the second plastic component;
    contacting the at least one first rib and the at least one second rib to form a welded joint assembly;
    operably supporting a housing to a fixture; and
    placing the first end of the plurality of fiber-optic cables in operable communication with a plurality of apertures of the housing.

2. The method of claim 1, further comprising directing the laser beam at a stationary reflective component that redirects the laser beam to the moveable reflective component.

3. The method of claim 1, wherein the moveable reflective component is mounted to a member within the housing, wherein the member is configured to displace in a controlled fashion the reflective component to direct the laser beam into distinct fiber-optic cables.

4. The method of claim 1, wherein the first plastic component includes a first plurality of ribs and the second plastic component includes a second plurality of ribs.

5. The method of claim 1, further comprising orienting a third plastic component having a third plurality of ribs in close proximity to the second plastic component, wherein a second laser array is arranged to direct a heating energy onto the third plurality of ribs and the second plurality of ribs.

* * * * *